US010373545B2

(12) United States Patent
Kim et al.

(10) Patent No.: US 10,373,545 B2
(45) Date of Patent: Aug. 6, 2019

(54) FRAME RATE CONTROL METHOD AND ELECTRONIC DEVICE THEREOF

(71) Applicant: Samsung Electronics Co., Ltd., Suwon-si, Gyeonggi-do (KR)

(72) Inventors: Hyoung-Il Kim, Seongnam-si (KR); Jung-Eun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/111,674

(22) PCT Filed: Jan. 8, 2015

(86) PCT No.: PCT/KR2015/000191
§ 371 (c)(1),
(2) Date: Jul. 14, 2016

(87) PCT Pub. No.: WO2015/108300
PCT Pub. Date: Jul. 23, 2015

(65) Prior Publication Data
US 2016/0343288 A1 Nov. 24, 2016

(30) Foreign Application Priority Data
Jan. 17, 2014 (KR) .................. 10-2014-0006080

(51) Int. Cl.
*G09G 5/00* (2006.01)
*G09G 3/20* (2006.01)
(Continued)

(52) U.S. Cl.
CPC ............. *G09G 3/2018* (2013.01); *G06F 1/32* (2013.01); *G06F 3/14* (2013.01); *G09G 5/026* (2013.01);
(Continued)

(58) Field of Classification Search
CPC .... G06F 1/32; G06F 3/14; G09G 3/20; G09G 3/2017; G09G 3/2018; G09G 5/026;
(Continued)

(56) References Cited

U.S. PATENT DOCUMENTS 5,311,203 A * 5/1994 Norton ................. G02B 27/025
33/355 R
5,321,750 A * 6/1994 Nadan ................. H04N 7/1675
348/476
(Continued)

FOREIGN PATENT DOCUMENTS

CN 1278687 A 1/2001
CN 1501698 A 6/2004
(Continued)

OTHER PUBLICATIONS

European Search Report dated Jul. 7, 2017, issued in the European Application No. 15737893.6.
(Continued)

*Primary Examiner* — Joe H Cheng
(74) *Attorney, Agent, or Firm* — Jefferson IP Law, LLP

(57) ABSTRACT

Various embodiments relate to an apparatus and a method for determining a frame rate in an electronic device. The method for determining a frame rate in an electronic device, according to one embodiment, comprises the steps of: comparing $1^{st}$ display data to be displayed at a reference time and $2^{nd}$ display data to be displayed after the reference time; and determining a frame rate based on the comparison result. The method for determining a frame rate in an electronic device can be implemented through various embodiments.

7 Claims, 15 Drawing Sheets

(51) Int. Cl.
  *G06F 3/14* (2006.01)
  *G06F 1/32* (2019.01)
  *G09G 5/02* (2006.01)

(52) U.S. Cl.
  CPC . *G09G 2320/106* (2013.01); *G09G 2330/021* (2013.01); *G09G 2330/022* (2013.01); *G09G 2340/0435* (2013.01); *G09G 2340/10* (2013.01); *G09G 2340/14* (2013.01)

(58) Field of Classification Search
  CPC ....... G09G 2320/106; G09G 2330/021; G09G 2330/022; G09G 2340/0435; G09G 2340/10; G09G 2340/14
  See application file for complete search history.

(56) References Cited

U.S. PATENT DOCUMENTS

| | | | | |
|---|---|---|---|---|
| 5,614,960 | A * | 3/1997 | Chiba | G11B 27/28 348/415.1 |
| 6,459,734 | B1 | 10/2002 | Kato et al. | |
| 6,697,061 | B1 * | 2/2004 | Wee | H04N 19/61 345/419 |
| 7,502,039 | B2 | 3/2009 | Koyama et al. | |
| 2005/0013586 | A1 * | 1/2005 | Bhatia | H04N 5/4401 386/232 |
| 2005/0074140 | A1 | 4/2005 | Grasso et al. | |
| 2005/0123044 | A1 * | 6/2005 | Katsavounidis | H03M 7/30 375/240.12 |
| 2005/0276446 | A1 * | 12/2005 | Chen | G06K 9/00771 382/103 |
| 2006/0238620 | A1 * | 10/2006 | Asada | H04N 5/232 348/207.99 |
| 2008/0100598 | A1 * | 5/2008 | Juenger | G09G 5/36 345/204 |
| 2008/0143728 | A1 | 6/2008 | Gorla et al. | |
| 2008/0284704 | A1 * | 11/2008 | Song | G09G 3/3614 345/94 |
| 2008/0291326 | A1 | 11/2008 | Shishido et al. | |
| 2009/0015712 | A1 * | 1/2009 | Sato | G06T 3/4007 348/441 |
| 2009/0273707 | A1 | 11/2009 | Miyoshi | |
| 2009/0322661 | A1 | 12/2009 | Bae et al. | |
| 2010/0002133 | A1 * | 1/2010 | Ueno | G09G 3/20 348/452 |
| 2010/0023837 | A1 * | 1/2010 | Nakagawa | H03M 13/35 714/752 |
| 2010/0118185 | A1 * | 5/2010 | Furukawa | G09G 3/2025 348/452 |
| 2010/0128169 | A1 * | 5/2010 | Yi | H04N 7/0125 348/441 |
| 2010/0177963 | A1 * | 7/2010 | Yokomitsu | B61L 23/00 382/170 |
| 2010/0214439 | A1 * | 8/2010 | Oshima | G03B 7/08 348/229.1 |
| 2010/0245316 | A1 * | 9/2010 | Cheng | G09G 3/3648 345/211 |
| 2011/0032419 | A1 | 2/2011 | Sakaniwa et al. | |
| 2011/0246801 | A1 * | 10/2011 | Seethaler | G06F 1/3218 713/323 |
| 2012/0144397 | A1 | 6/2012 | Imai et al. | |
| 2012/0144937 | A1 | 6/2012 | Moser et al. | |
| 2012/0169828 | A1 | 7/2012 | Lee | |
| 2013/0082981 | A1 * | 4/2013 | Chien | G06F 3/0425 345/175 |
| 2013/0194295 | A1 * | 8/2013 | Chan | G09G 3/3466 345/619 |
| 2013/0314449 | A1 * | 11/2013 | Chuei | G09G 3/3466 345/690 |
| 2013/0322697 | A1 * | 12/2013 | Grindstaff | G06T 7/246 382/107 |
| 2013/0328845 | A1 | 12/2013 | Pylappan et al. | |
| 2014/0043358 | A1 * | 2/2014 | Wang | G06T 9/00 345/619 |
| 2014/0062917 | A1 * | 3/2014 | Seo | G06F 3/041 345/173 |
| 2015/0172622 | A1 * | 6/2015 | Yoon | G09G 3/3406 345/694 |

FOREIGN PATENT DOCUMENTS

| | | |
|---|---|---|
| CN | 1606758 A | 4/2005 |
| CN | 101998029 A | 3/2011 |
| EP | 2234099 A1 | 9/2010 |
| JP | 11-177940 A | 7/1999 |
| JP | 2009-272781 A | 11/2009 |
| KR | 10-0836010 B1 | 6/2008 |
| KR | 10-2009-0084311 A | 8/2009 |
| KR | 10-0969420 B1 | 7/2010 |
| KR | 10-2012-0078838 A | 7/2012 |
| WO | 2009/011009 A1 | 1/2009 |

OTHER PUBLICATIONS

Chinese Office Action dated Apr. 3, 2019, issued in Chinese Patent Application No. 201580004929.4.

* cited by examiner

FRAME RATE CONTROL METHOD AND ELECTRONIC DEVICE THEREOF

TECHNICAL FIELD

Various embodiments relate to a technique for determining a frame rate in an electronic device.

BACKGROUND ART

Electronic devices are being developed into multimedia devices for providing various services such as voice and video call functions, information input and output functions, and data transmission and reception.

An electronic device is equipped with a battery having limited capacity to facilitate portability, and is recently equipped with a touch screen. Therefore, a technique for controlling power consumption becomes important.

Accordingly, manufacturers of the electronic device use a method for decreasing a clock of a Central Processing Unit (CPU) to decrease power consumption of the electronic device, or for decreasing brightness of a touch screen, or for decreasing a frame rate.

DETAILED DESCRIPTION OF THE INVENTION

Technical Objects

In various embodiments, there may be provided an apparatus and method for determining a frame rate of a display in an electronic device.

In various embodiments, there may be provided an apparatus and method for determining a frame rate of a display based on a comparison result of a plurality of pieces of display data in an electronic device.

In various embodiments, there may be provided an apparatus and method for determining a frame rate of a display based on a comparison result of a plurality of pieces of display data stored in a frame buffer in an electronic device.

In various embodiments, there may be provided an apparatus and method for determining a frame rate of a display by determining whether at least specific portions among changed portions of a plurality of pieces of display data are included in a reference area in an electronic device.

In various embodiments, there may be provided an apparatus and method for determining a frame rate of a display by determining whether there is a movement in an edge component included in a plurality of pieces of display data in an electronic device.

Solution to Problem

According to various embodiments, a method for determining a frame rate in an electronic device may include comparing $1^{st}$ display data to be displayed at a reference time and $2^{nd}$ display data to be displayed after the reference time, and determining a frame rate based on the comparison result.

According to the various embodiments, the method may include comparing the $1^{st}$ display data and the $2^{nd}$ display data stored in a frame buffer of the electronic device.

According to the various embodiments, the method may include identifying changed portions of the $1^{st}$ display data and the $2^{nd}$ display data, and determining whether at least specific portions among the changed portions of the $1^{st}$ display data and the $2^{nd}$ display data are included in a reference area.

According to the various embodiments, the method may include increasing the frame rate if the at least specific portions among the changed portions of the $1^{st}$ display data and the $2^{nd}$ display data are included in the reference area.

According to the various embodiments, the method may include decreasing or maintaining the frame rate if the at least specific portions among the changed portions of the $1^{st}$ display data and the $2^{nd}$ display data are not included in the reference area.

According to the various embodiments, the method may include determining whether an edge component exists in the $1^{st}$ display data and the $2^{nd}$ display data, and determining whether the edge component moves.

According to the various embodiments, the method may include increasing the frame rate if the edge component moves.

According to the various embodiments, the method may include decreasing or maintaining the frame rate if the edge component does not move.

According to the various embodiments, the method may include comparing the $1^{st}$ display data and the $2^{nd}$ display data for each area of a specific size.

According to the various embodiments, the method may include determining the frame rate for each area based on the comparison result for each area of a specific size.

According to various embodiments, an electronic device may include a display, a memory, and a processor for comparing $1^{st}$ display data to be displayed to the display at a reference time and $2^{nd}$ display data to be displayed to the display after the reference time, and for determining a frame rate based on the comparison result.

According to the various embodiments, the electronic device may include a processor for comparing the $1^{st}$ display data and $2^{nd}$ display data stored in a frame buffer of the memory.

According to the various embodiments, the electronic device may include a processor for identifying changed portions of the $1^{st}$ display data and the $2^{nd}$ display data, and for determining whether at least specific portions among the changed portions of the $1^{st}$ display data and the $2^{nd}$ display data are included in a reference area.

According to the various embodiments, the electronic device may include a processor for increasing the frame rate if the at least specific portions among the changed portions of the $1^{st}$ display data and the $2^{nd}$ display data are included in the reference area.

According to the various embodiments, the electronic device may include a processor for decreasing or maintaining the frame rate if the at least specific portions among the changed portions of the $1^{st}$ display data and the $2^{nd}$ display data are not included in the reference area.

According to the various embodiments, the electronic device may include a processor for determining whether an edge component exists in the $1^{st}$ display data and the $2^{nd}$ display data, and for determining whether the edge component moves.

According to the various embodiments, the electronic device may include a processor for increasing the frame rate if the edge component moves According to the various embodiments, the electronic device may include a processor for decreasing or maintaining the frame rate if the edge component does not move.

According to the various embodiments, the electronic device may include a processor for comparing the $1^{st}$ display data and the $2^{nd}$ display data for each area of a specific size.

According to the various embodiments, the electronic device may include a processor for determining the frame rate for each area based on the comparison result for each area of a specific size of the display.

Advantageous Effects of Invention

As described above, an electronic device analyzes a plurality of frames to be displayed to a display and dynamically determines a frame rate according to a difference of frames. Therefore, the electronic device having a display can decrease current consumption when the display data is displayed to the display.

BEST MODE FOR EMBODYING THE INVENTION

Figure 1:
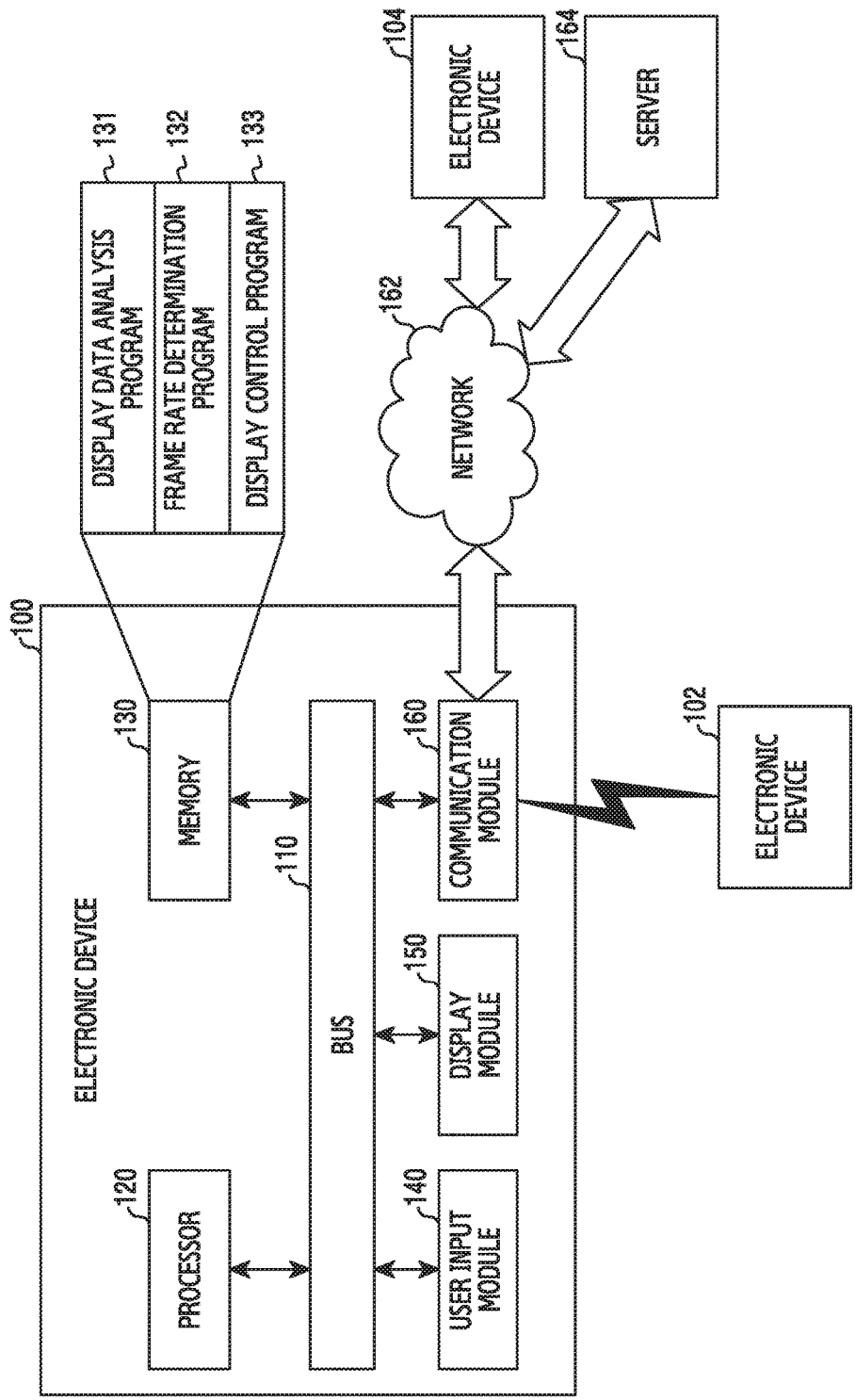
FIG. 1 is a block diagram of an electronic device according to various embodiments.

Hereinafter, various embodiments are described with reference to the accompanying drawings. While the various embodiments are susceptible to various modifications and alternative forms, a specific embodiment thereof has been shown by way of example in the drawings and will herein be described in detail. It should be understood, however, that it is not intended to limit the various embodiments to the particular form disclosed, but, on the contrary, the various embodiments are to cover all modifications and/or equivalents and alternatives falling within the spirit and scope of the various embodiments as defined by the appended claims. Like reference numerals denote like constitutional elements throughout the drawings An electronic device according to various embodiments may be one or more combinations of various devices such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligent robot, a TeleVision (TV), a Digital Video Disk (DVD) player, an audio, an oven, a microwave oven, a washing machine, an air purifier, an electronic picture frame, etc.), various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship (e.g., a vessel navigation device, a gyro compass, etc.), avionics, a security device, an electronic costume, an electronic key, a camcorder, game consoles, a Head-Mounted Display (HMD), a flat panel display device, an electronic album, a furniture or a part of building/constructions including a communication function, an electronic board, an electronic signature receiving device, a projector, etc. It is apparent to those ordinarily skilled in the art that the electronic device according to the various embodiments is not limited to the aforementioned devices.

FIG. 1 is a block diagram of an electronic device according to various embodiments.

Referring to FIG. 1, an electronic device 100 may include a bus 110, a processor 120, a memory 130, a user input module 140, a display module 150, or a communication module 160.

The bus 110 may be a circuit for connecting the aforementioned constitutional elements (e.g., the bus 110, the processor 120, the memory 130, the user input module 140, the display module 150, or the communication module 160) and for delivering communication (e.g., a control message) between the aforementioned constitutional elements.

Figure 2:
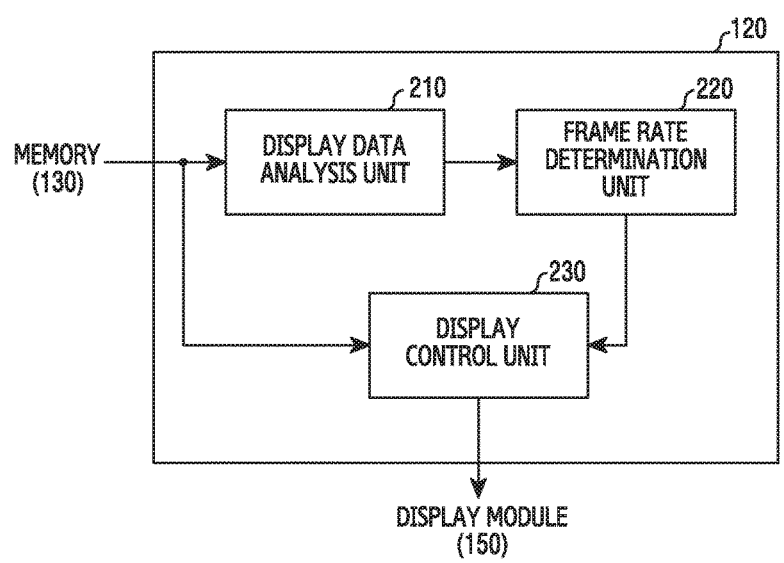
FIG. 2 is a block diagram of a processor according to various embodiments.

The processor 120 may receive an instruction from other constitutional elements included in the electronic device 100, and may interpret the received instruction and execute an arithmetic operation or data processing according to the interpreted instruction. In this case, the processor 120 may provide control to execute at least one application stored in the memory 130 and to provide a service according to the application. For example, the processor 120 may be configured as illustrated in FIG. 2 to control a frame rate of a display by executing a display data analysis program 131, a frame rate determination program 132, and a display control program 133.

In addition, the processor 120 may include one or more Application Processors (APs) or one or more Communication Processors (CPs). Herein, the AP and the CP may be included in the processor 120 or may be included respectively in different Integrated Circuit (IC) packages. In addition, the AP and the CP may be included in one IC package. The AP may control a plurality of hardware or software constitutional elements connected to the AP by driving an operating system or an application program, and may process a variety of data including multimedia data and may perform an arithmetic operation. Herein, the AP may be implemented with a System on Chip (SoC). In addition, the CP may perform at least a part of a multimedia control function. In addition, the CP may identify and authenticate a terminal in a communication network by using a subscriber identity module (e.g., Subscriber Identity Module (SIM) card). In this case, the CP may provide a service including a voice call, a video call, a text message, or packet data to a user. In addition, the CP may control data transmission/reception of the communication module 160. The AP or the CP may load an instruction or data, which is received from each non-volatile memory connected thereto or at least one of different constitutional elements, to a volatile memory and may process the instruction or data. In addition, the AP or the CP may store data, which is received from at least one of different constitutional elements or generated by at least one of different constitutional elements, in the non-volatile memory. The CP may perform a function of managing a data link and changing a communication protocol in communication between different electronic devices connected through a network to an electronic device including hardware entities. Herein, the CP may be implemented with an SoC. In addition, the processor 120 may further include a Graphic Processing Unit (GPU).

The memory 130 may store an instruction or data received from the processor 120 or other constitutional elements (e.g., the user input module 140, the display module 150, and the communication module 160) or generated by the processor 120 or other constitutional elements. In this case, the memory may include an internal buffer and an external butter.

In addition, the memory 130 may include the display data analysis program 131, the frame rate determination program 132, and the display control program 133. In this case, each application may be configured with a programming module, and each programming module may be configured in software, firmware, hardware, or at least two or more of combinations thereof.

The display data analysis program 131 includes at least one software constitutional element for comparing a plurality of pieces of display data stored in the frame buffer. For example, the display data analysis program 131 may identify a changed portion of $1^{st}$ display data and $2^{nd}$ display data, and may determine whether at least specific portions among changed portions of the $1^{st}$ display data and the $2^{nd}$ display data are included in a reference area. For another example, the display data analysis program 131 may determine whether an edge component exists in the $1^{st}$ display and the $2^{nd}$ display data, and if the edge component exists, may determine whether the edge component moves. In this case, the display data analysis program 131 may compare the $1^{st}$ display data and the $2^{nd}$ display data for each area (e.g., for each tile) of a specific size.

The frame rate determination program 132 may include at least one software constitutional element for controlling the determination of the frame rate based on the comparison result of display data delivered from the display data analysis program 131. For example, the frame rate determination program 132 may increase the frame rate if the at least specific portions among the changed portions of the $1^{st}$ display data and the $2^{nd}$ display data are included in the reference area. For another example, the frame rate determination program 132 may decrease or maintain the frame rate if the at least specific portions among the changed portions of the $1^{st}$ display data and the $2^{nd}$ display data are not included in the reference area. For another example, the frame rate determination program 132 may increase the frame rate if the edge component exists in the $1^{st}$ display data and the $2^{nd}$ display data and the edge component moves. For another example, the frame rate determination program 132 may decrease or maintain the frame rate if the edge component exists in the $1^{st}$ display data and the $2^{nd}$ display data and the edge component does not move. For another example, the frame rate determination program 132 may determine the frame rate for each area based on the comparison result for each area of a specific size.

The display control program 133 includes at least one software constitutional element to provide control such that at least one piece of display data is displayed through the display module 150. For example, the display control program 133 may control to display at least one piece of display data through the display module 150. In this case, the display control program 133 may display the display data through the display module 150 based on the frame rate delivered from the frame rate determination program 132.

In addition, the memory 130 may include an internal memory or an external memory. The internal memory may include at least one of a volatile memory (e.g., a Dynamic RAM (DRAM), a Static RAM (SRAM), a Synchronous Dynamic RAM (SDRAM), etc.) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.). In this case, the internal memory may have a form of a Solid State Drive (SSD). The external memory may further include Compact Flash (CF), Secure Digital (SD), Micro Secure Digital (Micro-SD), Mini Secure digital (Mini-SD), extreme Digital (xD), memory stick, etc.

In addition, the memory 130 may further include a kernel, a middleware, and an Application Programming Interface (API). The kernel may control or manage system resources (e.g., the bus 110, the processor 120, or memory 130) used to execute an operation or function implemented in the remaining other programming modules (e.g., the middleware, the API, or the application). In addition, the kernel may provide a controllable or manageable interface by accessing individual constitutional elements of the electronic device 100 in the middleware, the API, or the application. The middleware may perform an intermediary role so that the API or the application communicates with the kernel to exchange data. In addition, the middleware may perform load balancing for the task request by using a method of assigning a priority capable of using a system resource (e.g., the bus 110, the processor 120, or memory 130) of the electronic device 100. The API may include at least one interface or function for file control, window control, video processing, or character control, etc., as an interface capable of controlling a function provided by the application in the kernel or the middleware.

The user input module 140 may receive an instruction or data from a user and deliver it to the processor 120 or the memory 130 via the bus 110. For example, the user input module 140 may include a touch panel, a pen sensor, a key, or an ultrasonic input unit. For example, the touch panel may recognize a touch input by using at least one of an electrostatic type, a pressure-sensitive type, and an ultrasonic type. Herein, the touch panel may further include a controller. In case of the electrostatic type, not only direct touch but also proximity recognition is also possible. The touch penal may further include a tactile layer. In this case, the touch panel may provide the user with a tactile reaction. For example, the pen sensor may be implemented by using the same or similar method of receiving a touch input of the user or by using an additional sheet for recognition. For example, the key may include a keypad or a touch key. For example, the ultrasonic input unit is a device by which the electronic device detects a sound wave through a microphone by using a pen which generates an ultrasonic signal, and is a device capable of radio recognition.

The display module 150 may display image, video, or data to the user. For example, the display module 150 may include a panel or a hologram. For example, the panel may be a Liquid-Crystal Display (LCD) or an Active-Matrix Organic Light-Emitting Diode (AM-OLED). In addition, the panel may be implemented in a flexible, transparent, or wearable manner Herein, the panel may be constructed as one module with the touch panel. For example, the hologram may use an interference of light and show a stereoscopic image in the air. In addition, the display module 150 may further include a control circuit for controlling the panel or the hologram.

In addition, the display module 150 may display the display data under the control of the display control application 133. In this case, the display module 150 may display the display data based on a frame rate delivered from the frame rate determination program 132.

The communication module 160 may connect communication between a different electronic device 102 or 104 and the electronic device 100. In this case, the communication module 160 may support a specific near-field communication protocol (e.g., Wireless Fidelity (WiFi), Bluetooth (BT), Near Field Communication (NFC), or specific network communication 162 (e.g., Internet, Local Area Network (LAN), Wide Area Network (WAN), telecommunication network, cellular network, satellite network, Plain Old Telephone Service (POTS), etc.).

Each of the different electronic devices 102 and 104 may be a device which is the same (e.g., the same type) as the electronic device 100 or may be a different (e.g., a different type) device.

In addition, the electronic device may further include a sensor module. The sensor module may include at least one of a gesture sensor, a gyro sensor, a pressure sensor, a magnetic sensor, an acceleration sensor, a grip sensor, a proximity sensor, a Red, Green, Blue (RGB) sensor, a bio sensor, a temperature/humidity sensor, an illumination sensor, and an Ultra Violet (UV) sensor. In addition, the sensor module may measure a physical quantity or detect an operation state of the electronic device, and thus may convert the measured or detected information into an electric signal. For example, the sensor module may include an E-nose sensor, an ElectroMyoGraphy (EMG) sensor, an ElectroEncephaloGram (EEG) sensor, an ElectroCardioGram (ECG) sensor, a fingerprint sensor, etc. In addition, the sensor module may further include a control circuit for controlling at least one or more sensors included therein.

Names of the aforementioned constitutional elements of the hardware according to the various embodiments may vary depending on a type of the electronic device. The hardware according to the various embodiments may include at least one of the aforementioned constitutional elements. Some of the constitutional elements may be omitted, or additional other constitutional elements may be further included. In addition, some of the constitutional elements of the hardware according to the various embodiments may be combined and constructed to one entity, so as to equally perform functions of corresponding constitutional elements before combination.

FIG. 2 is a block diagram of a processor according to various embodiments.

As illustrated in FIG. 2, the processor 120 includes a display data analysis unit 210, a frame rate determination unit 220, and a display control unit 230.

The display data analysis unit 210 may execute display data analysis program 131 stored in the memory 130 to control comparison of a plurality of pieces of display data stored in a frame buffer. For example, the display data analysis unit 210 may identify a changed portion of $1^{st}$ display data and $2^{nd}$ display data, and may determine whether at least specific portions among changed portions of the $1^{st}$ display data and the $2^{nd}$ display data are included in a reference area. For another example, the display data analysis unit 210 may determine whether an edge component exists in the $1^{st}$ display and the $2^{nd}$ display data, and if the edge component exists, may determine whether the edge component moves. In this case, the display data analysis unit 210 may compare the $1^{st}$ display data and the $2^{nd}$ display data for each area (e.g., for each tile) of a specific size.

The frame rate determination unit 220 may execute the frame rate determination program 132 stored in the memory 130 to control the determination of the frame rate based on the comparison result of display data delivered from the display data analysis unit 210. For example, the frame rate determination unit 220 may increase the frame rate if the at least specific portions among the changed portions of the $1^{st}$ display data and the $2^{nd}$ display data are included in the reference area. For another example, the frame rate determination unit 220 may decrease or maintain the frame rate if the at least specific portions among the changed portions of the $1^{st}$ display data and the $2^{nd}$ display data are not included in the reference area. For another example, the frame rate determination unit 220 may increase the frame rate if the edge component exists in the $1^{st}$ display data and the $2^{nd}$ display data and the edge component moves. For another example, the frame rate determination unit 220 may decrease or maintain the frame rate if the edge component exists in the $1^{st}$ display data and the $2^{nd}$ display data and the edge component does not move. For another example, the frame rate determination unit 220 may determine the frame rate for each area based on the comparison result for each area of a specific size.

The display control unit 230 may execute the display control program 133 stored in the memory 130 to control the display of the display data through the display module 150. For example, the display control unit 230 may provide control to display at least one piece of display data through the display module 150. In this case, the display control unit 230 may display the display data through the display module 150 based on the frame rate delivered from the frame rate determination unit 220.

Figure 3:
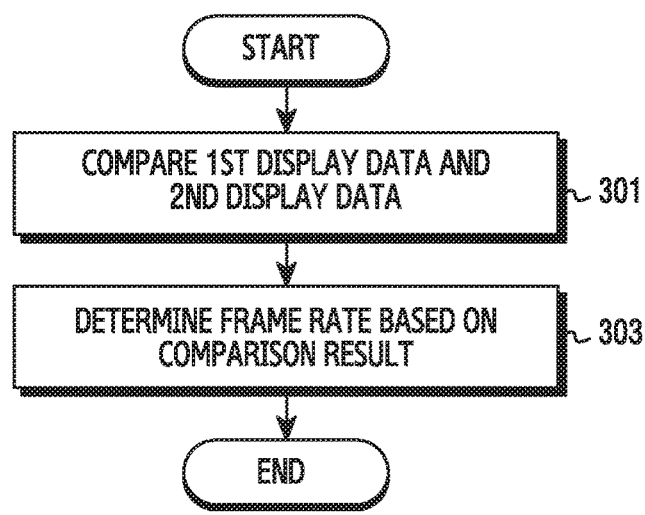
FIG. 3 illustrates a procedure for determining a frame rate in an electronic device according to various embodiments.

FIG. 3 illustrates a procedure for determining a frame rate in an electronic device according to various embodiments.

Referring to FIG. 3, in step 301, the electronic device may compare $1^{st}$ display data and $2^{nd}$ display data. According to one embodiment, the $1^{st}$ display data and the $2^{nd}$ display data may be an image displayed to a display or an image to be displayed to the display, as an image stored in a frame buffer. According to one embodiment, the $2^{nd}$ display data may be an image to be displayed at a next time of displaying the $1^{st}$ display data.

According to one embodiment, the electronic device may determine whether an edge component exists in the $1^{st}$ display and the $2^{nd}$ display data, and if the edge component exists, may determine whether the edge component moves. According to one embodiment, the electronic device may determine whether an edge component exists in the $1^{st}$ display and the $2^{nd}$ display data, and if the edge component exists, may determine whether the edge component moves. According to one embodiment, the electronic device may compare the $1^{st}$ display data and the $2^{nd}$ display data for each area (e.g., for each tile) of a specific size.

In step 303, the electronic device may determine the frame rate based on the comparison result. According to one embodiment, the electronic device may increase the frame rate if the at least specific portions among the changed portions of the $1^{st}$ display data and the $2^{nd}$ display data are included in the reference area. According to one embodiment, the electronic device may decrease or maintain the frame rate if the at least specific portions among the changed portions of the $1^{st}$ display data and the $2^{nd}$ display data are not included in the reference area. According to one embodiment, the electronic device may increase the frame rate if the edge component exists in the $1^{st}$ display data and the $2^{nd}$ display data and the edge component moves. According to one embodiment, the electronic device may decrease or maintain the frame rate if the edge component exists in the $1^{st}$ display data and the $2^{nd}$ display data and the edge component does not move. According to one embodiment, the electronic device may determine the frame rate for each area based on the comparison result for each area of a specific size.

Figure 4:
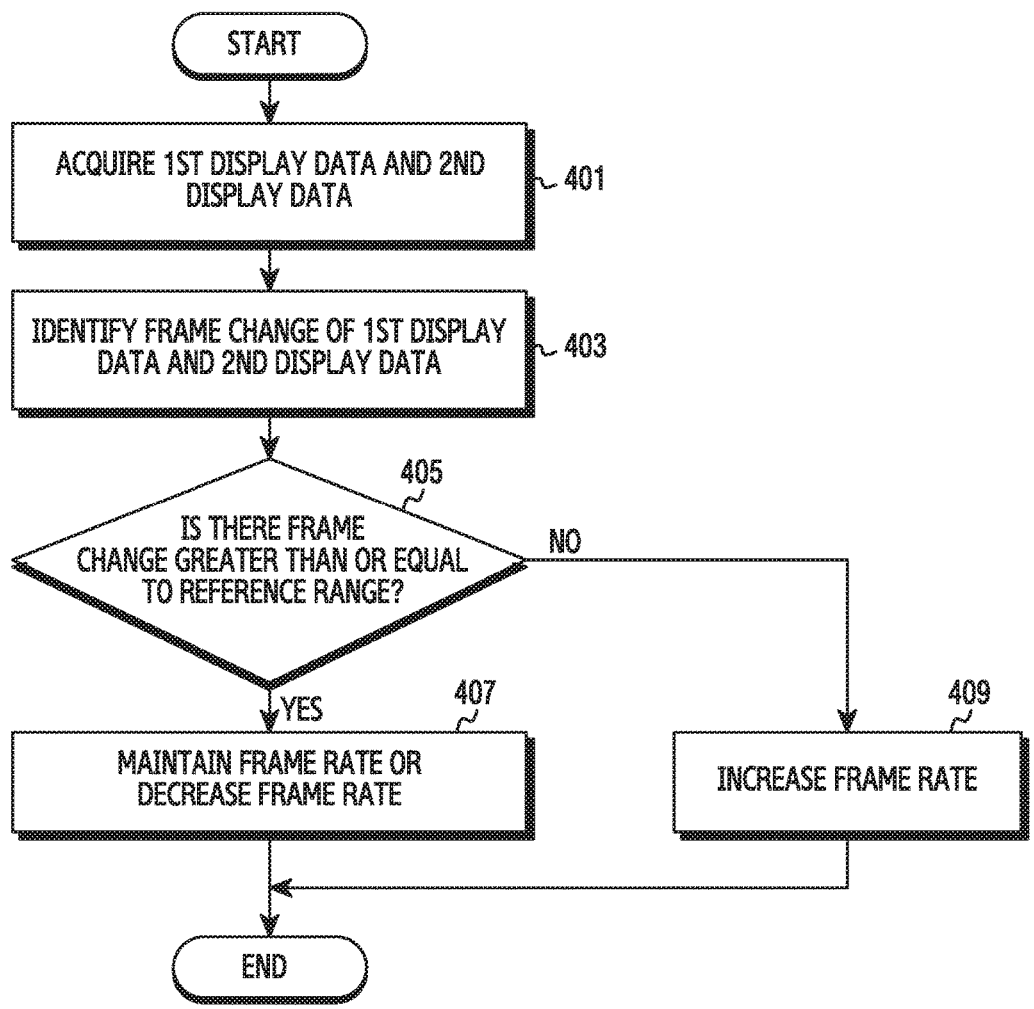
FIG. 4 illustrates a procedure for determining a frame rate based on comparison of a plurality of pieces of display data in an electronic device according to various embodiments.

FIG. 4 illustrates a procedure for determining a frame rate based on comparison of a plurality of pieces of display data in an electronic device according to various embodiments.

Figure 5A:
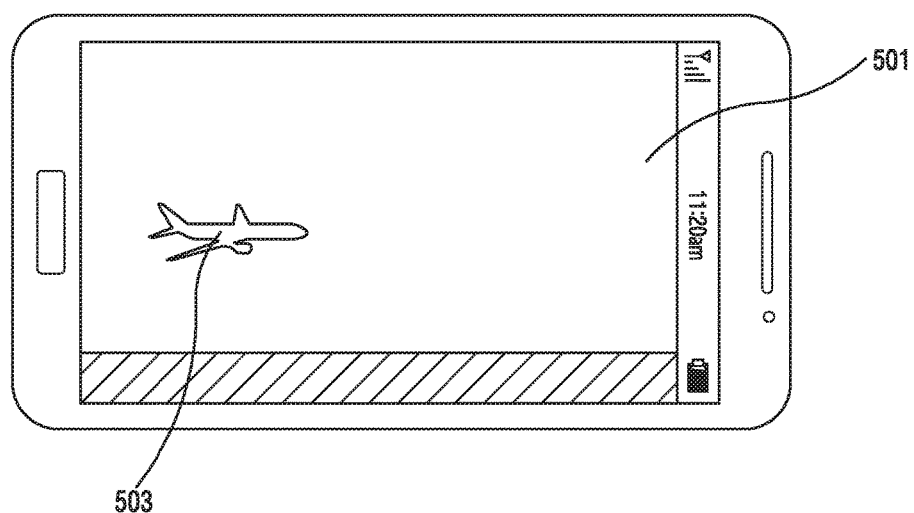
FIG. 5A to FIG. 5C illustrate a screen configuration for determining a frame rate based on comparison of a plurality of pieces of display data in an electronic device according to various embodiments.

Referring to FIG. 4, in step 401, the electronic device may acquire $1^{st}$ display data and $2^{nd}$ display data. According to one embodiment, the $1^{st}$ display data and the $2^{nd}$ display data may be an image displayed to a display or an image to be displayed to the display, as an image stored in a frame buffer. According to one embodiment, the $2^{nd}$ display data may be an image to be displayed at a next time of displaying the $1^{st}$ display data. According to one embodiment, a $1^{st}$ image 501 of FIG. 5A may be the $1^{st}$ display data, and a $2^{nd}$ image 521 of FIG. 5C may be the $2^{nd}$ display data.

In step 403, the electronic device may identify a frame change of the $1^{st}$ display data and the $2^{nd}$ display data. According to one embodiment, the electronic device may identify a changed portion between the $1^{st}$ image 501 of FIG. 5A and the $2^{nd}$ image 511 of FIG. 5B.

Figure 5B:
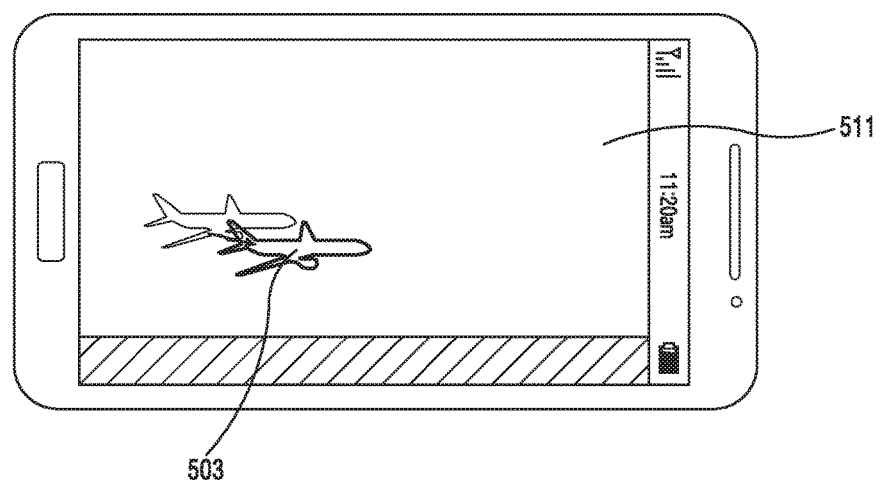

In step 405, the electronic device may determine whether there is a frame change greater than or equal to a reference range. According to one embodiment, the electronic device may determine whether the changed portion between the $1^{st}$ image 501 of FIG. 5A and the $2^{nd}$ image 511 of FIG. 5B is densely present within the reference range. According to one embodiment, the electronic device may determine whether the number of changed pixels is greater than or equal to a reference number in a reference area among changed pixels between the $1^{st}$ image 501 of FIG. 5A and the $2^{nd}$ image 511 of FIG. 5B.

If the frame change is greater than or equal to the reference range, in step 407, the electronic device maintains the frame rate or decreases the frame rate. According to one embodiment, if the number of changed pixels is not greater than or equal to the reference number in the reference area among the changed pixels between the $1^{st}$ image 501 of FIG. 5A and the $2^{nd}$ image 511 of FIG. 5B, the electronic device may determine that users' eyes will not be focused on one portion of the image but will be distributed, and thus may maintain the frame rate to the current frame rate or may decrease the frame rate to be lower than the current frame rate.

Figure 5C:
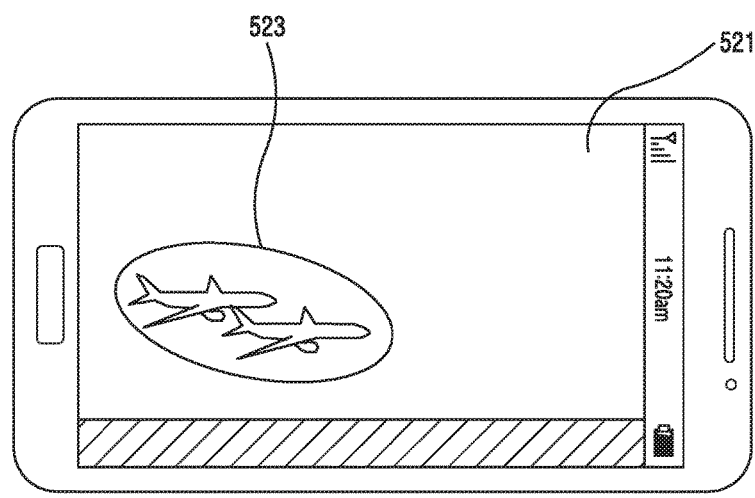

If the frame change is not greater than or equal to the reference range, in step 409, the electronic device may increase the frame rate. According to one embodiment, a $3^{rd}$ image 521 of FIG. 5C shows an example in which the number of changed pixels is greater than or equal to a reference number in a reference area 523 among changed pixels between the $1^{st}$ image 501 and the $2^{nd}$ image 511. In this case, the electronic device may determine that users' eyes will be focused on the reference area 523 in which the number of changed pixels is greater than or equal to the reference number, and thus may increase the frame rate to be greater than the current frame rate.

In the aforementioned embodiment, the electronic device may determine the frame rate of the display by determining whether a portion in which a frame change occurs in each piece of display data is concentrated on some areas.

Figure 6:
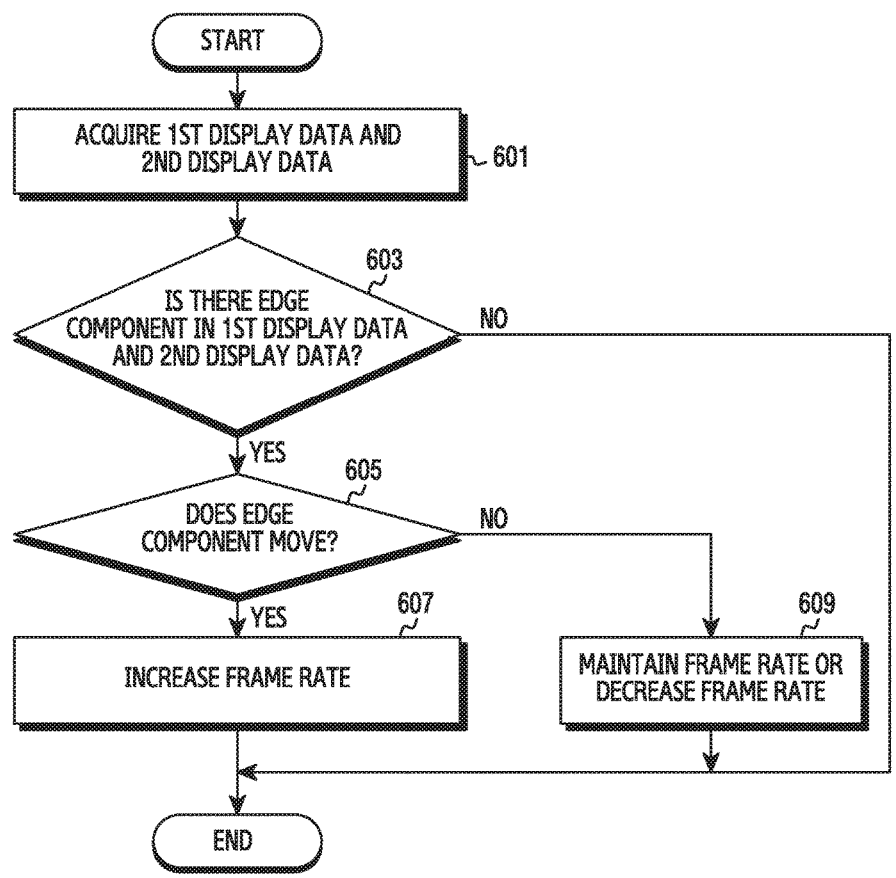
FIG. 6 illustrates a procedure for determining a frame rate based on whether there is a movement in an edge included in a plurality of pieces of display data in an electronic device according to various embodiments.

In another embodiment, the electronic device may determine the frame rate of the display by determining whether an edge component moves in each piece of display data as shown in FIG. 6 below.

FIG. 6 illustrates a procedure for determining a frame rate based on whether there is a movement in an edge included in a plurality of pieces of display data in an electronic device according to various embodiments.

Referring to FIG. 6, in step 601, the electronic device may acquire $1^{st}$ display data and $2^{nd}$ display data. According to one embodiment, the $1^{st}$ display data and the $2^{nd}$ display data may be an image displayed to a display or an image to be displayed to the display, as an image stored in a frame buffer. According to one embodiment, the $2^{nd}$ display data may be an image to be displayed at a next time of displaying the $1^{st}$ display data. According to one embodiment, a $1^{st}$ image 701 of FIG. 7A may be the $1^{st}$ display data, and a $2^{nd}$ image 721 of FIG. 7C may be the $2^{nd}$ display data.

In step 603, the electronic device may determine whether an edge component exists in the $1^{st}$ display data and the $2^{nd}$ display data. According to one embodiment, if the edge component does not exist in the $1^{st}$ display data and the $2^{nd}$ display data, the electronic device may end the present algorithm.

Figure 7A:
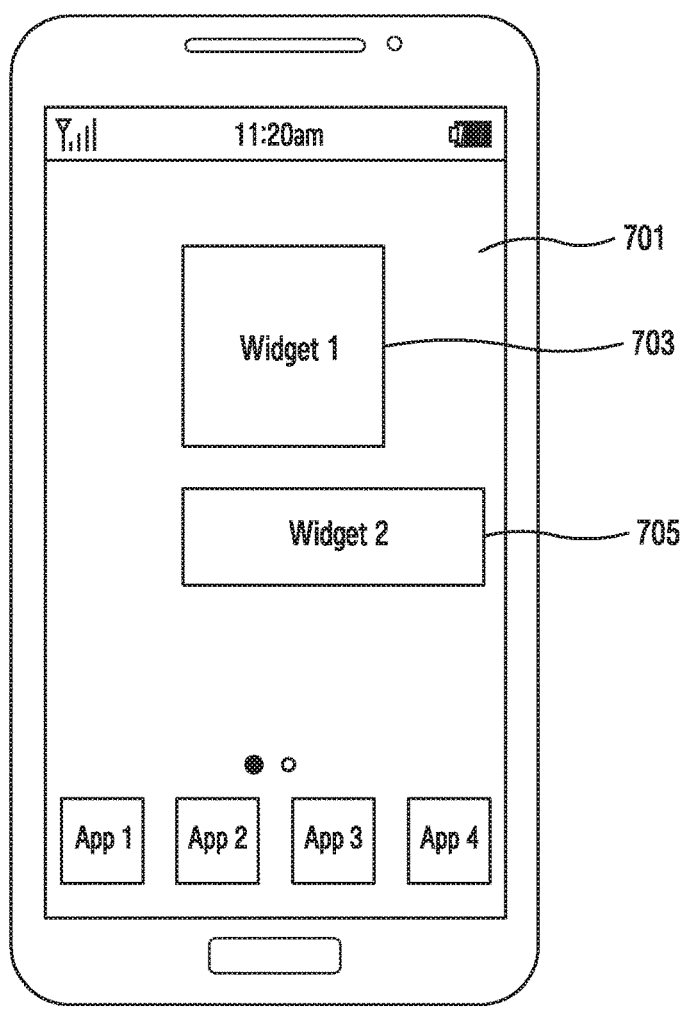
FIG. 7A to FIG. 7C illustrate a screen configuration for determining a frame rate based on whether there is a movement in an edge included in a plurality of pieces of display data in an electronic device according to various embodiments.

If the edge component exists in the $1^{st}$ display data and the $2^{nd}$ display data, the electronic device may determine whether the edge component moves in step 605. According to one embodiment, as shown in FIG. 7A, if edge components 703, 705, 723, and 725 exist in the $1^{st}$ image 701 of FIG. 7A and $2^{nd}$ image 721 of FIG. 7B, the electronic device may compare the edge components 703 and 705 of the $1^{st}$ image 701 and the edge components 723 and 725 of the $2^{nd}$ image 721 to determine whether the edge components 703 and 705 of the $1^{st}$ image 701 move.

Figure 7B:
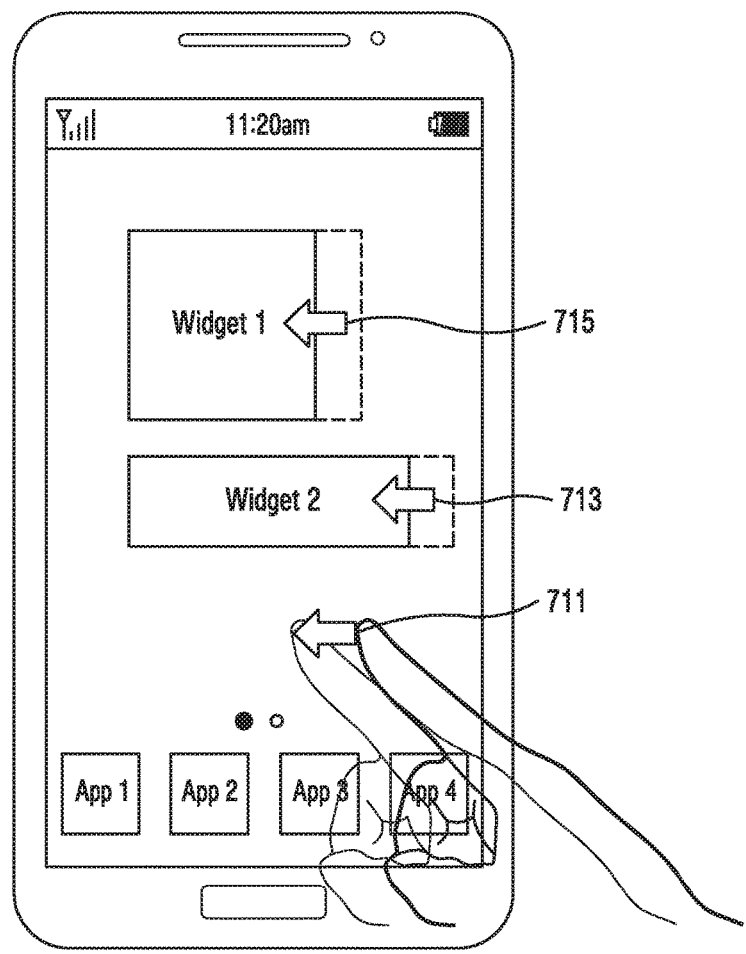
Figure 7C:
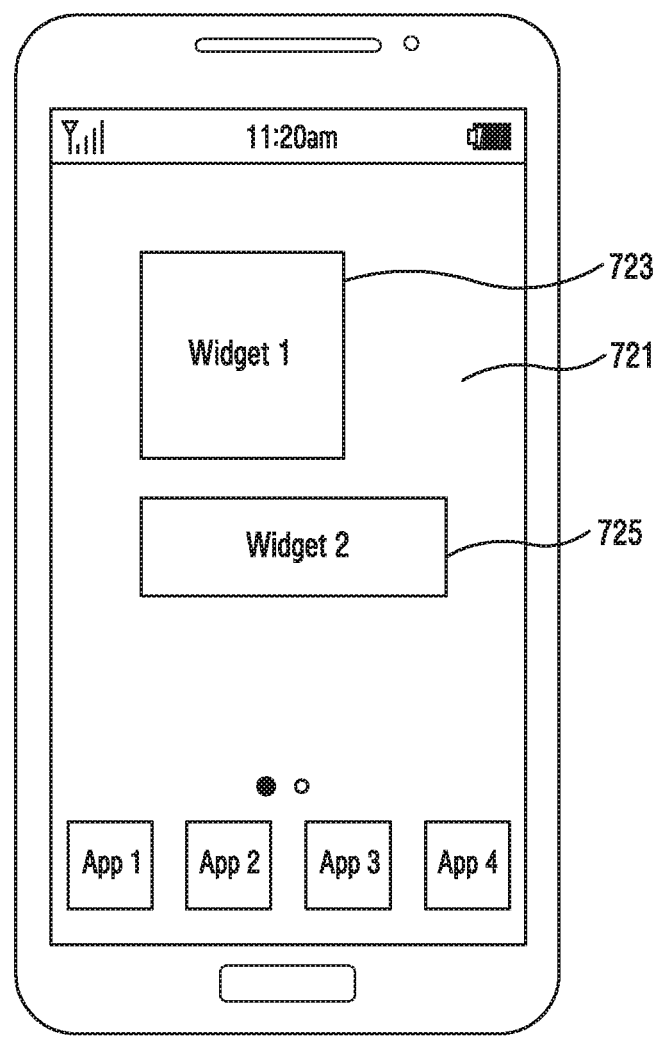

If the edge component moves, the electronic device may increase a frame rate in step 607. According to one embodiment, if the edge component moves, the electronic device may determine that users' eyes will be focused on the moving edge components and thus may increase the frame rate to be greater than a current frame rate. More specifically, if the $1^{st}$ image 701 of FIG. 7A is displayed and thereafter a user's screen switch event 711 occurs as shown in FIG. 7B, the electronic device displays the $2^{nd}$ image 721 of FIG. 7C. In this case, the electronic device may determine whether the edge components 703 and 705 of the $1^{st}$ image 701 move in comparison with the edge components 723 and 725 of the $2^{nd}$ image 721. If the edge components move as shown in FIG. 7B (see 713 and 715), the electronic device may increase the frame rate to be greater than the current frame rate.

If the edge component does not move, the electronic device maintain the frame rate or decrease the frame rate in step 609. According to one embodiment, if the edge component does not move, the electronic device may determine that the users' eyes will not be focused on the edge component and thus may maintain the frame rate to the current frame rate or may decrease the frame rate to be lower than the current frame rate.

In the aforementioned embodiment, the electronic device may determine the frame rate of the entire display based on whether there is a change in each piece of display data.

Figure 8:
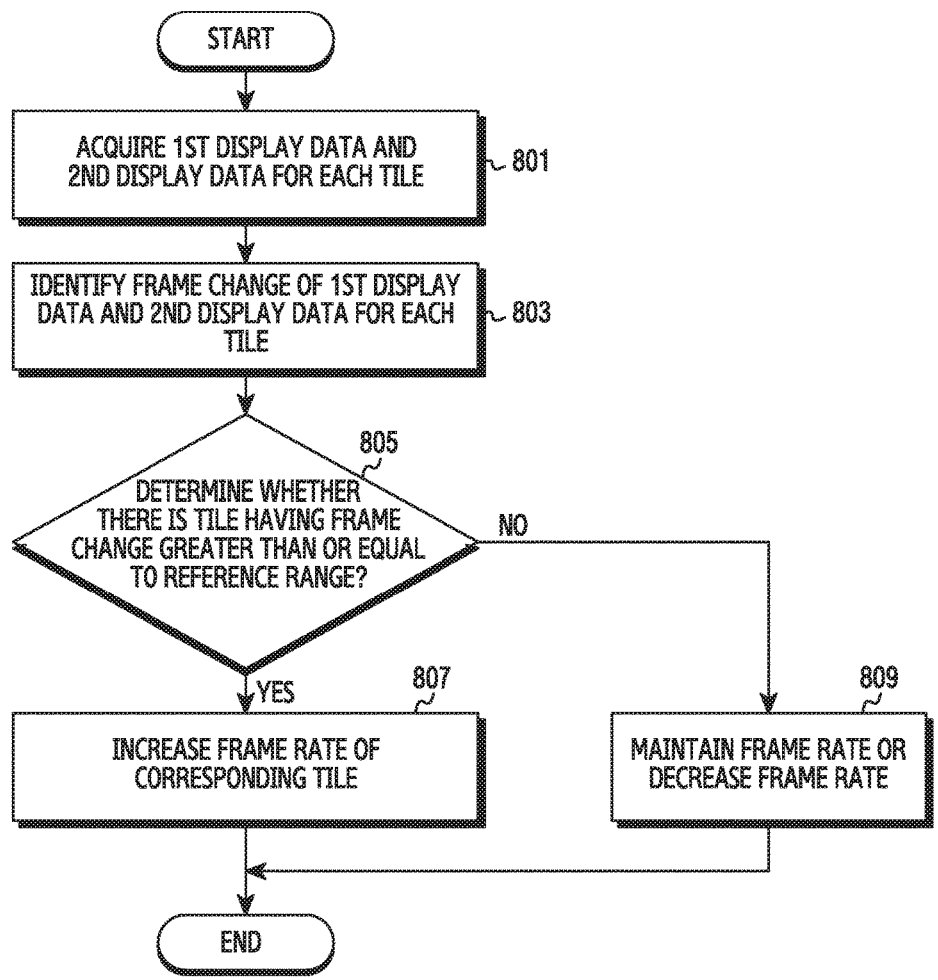
FIG. 8 illustrates a procedure for determining a frame rate for each tile based on comparison of a plurality of pieces of display data for each tile in an electronic device according to various embodiments.

According to another embodiment, the electronic device may determine a frame rate of a display for each tile based on whether there is a change in display data for each tile as shown in FIG. 8.

FIG. 8 illustrates a procedure for determining a frame rate for each tile based on comparison of a plurality of pieces of display data for each tile in an electronic device according to various embodiments.

Figure 9A:
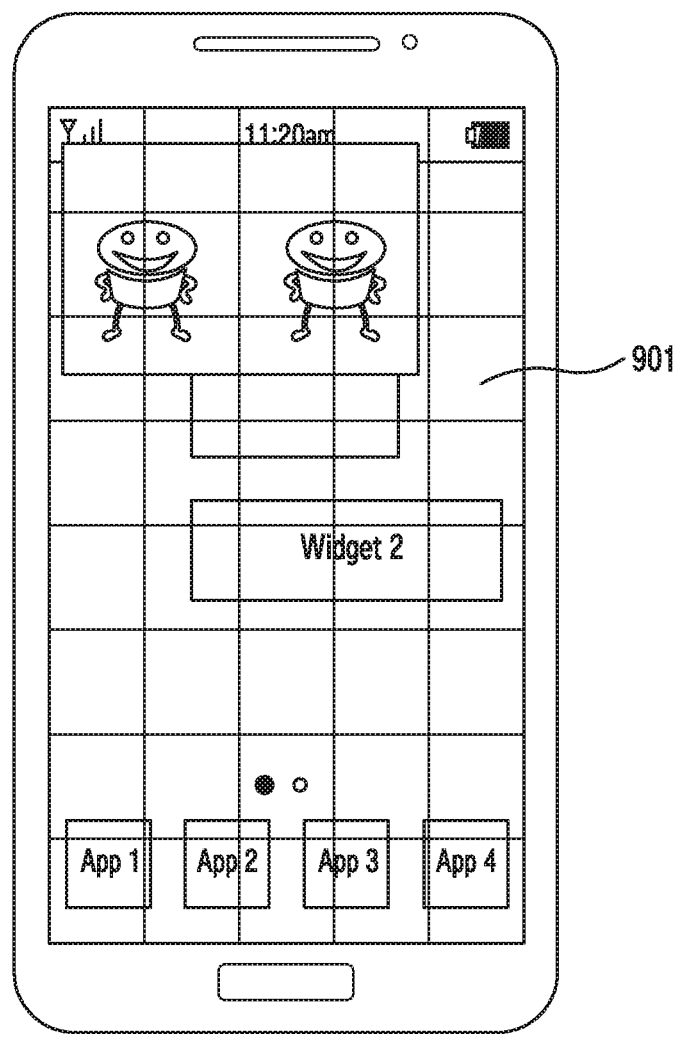
FIG. 9A to FIG. 9C illustrate a screen configuration for determining a frame rate for each tile based on comparison for each tile of a plurality of pieces of display data in an electronic device according to various embodiments.
Figure 9B:
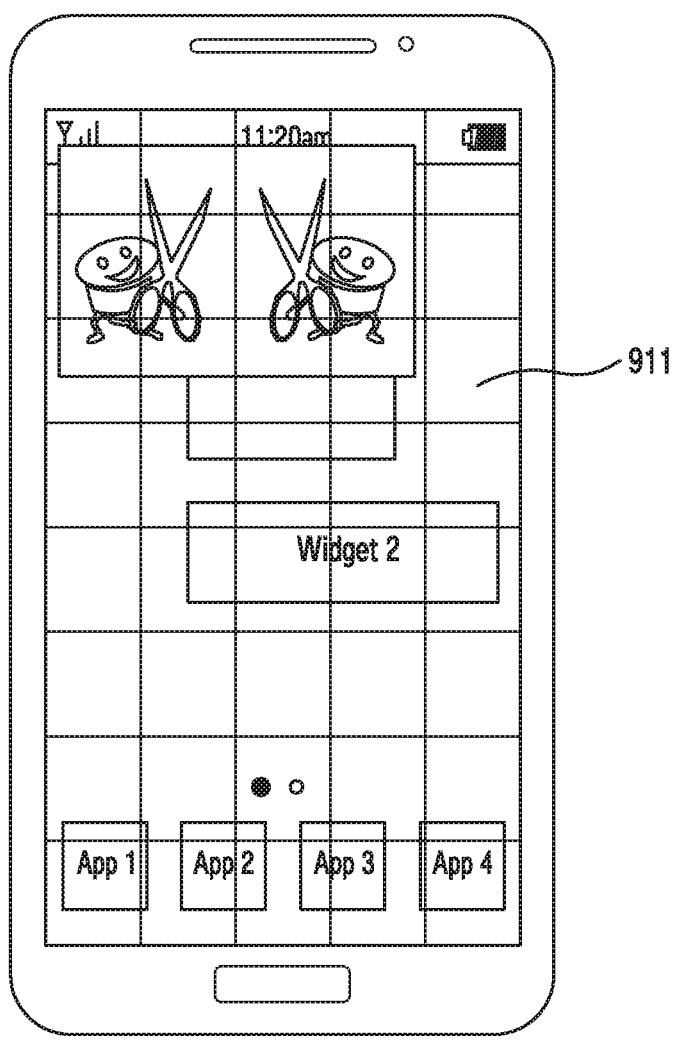

Referring to FIG. 8, in step 801, the electronic device may acquire $1^{st}$ display data and $2^{nd}$ display data for each tile. According to one embodiment, the $1^{st}$ display data and the $2^{nd}$ display data may be an image displayed to a display or an image to be displayed to the display, as an image stored in a frame buffer. According to one embodiment, the $2^{nd}$ display data may be an image to be displayed at a next time of displaying the $1^{st}$ display data. According to one embodiment, a $1^{st}$ image 901 of FIG. 9A may be the $1^{st}$ display data, and a $2^{nd}$ image 911 of FIG. 9B may be the $2^{nd}$ display data.

In step 803, the electronic device may identify a frame change of the $1^{st}$ display data and the $2^{nd}$ display data for each tile. According to one embodiment, the electronic device may determine whether there is a tile including a changed portion between the $1^{st}$ image 901 of FIG. 9A and the $2^{nd}$ image 911 of FIG. 9B.

In step 805, the electronic device may determine whether there is a tile having a frame change greater than or equal to a reference range. According to one embodiment, the electronic device may determine whether there is a changed tile between the $1^{st}$ image 901 of FIG. 9A and the $2^{nd}$ image 911 of FIG. 9B. According to one embodiment, the electronic device may determine whether the number of changed pixels is greater than or equal to a reference number in a tile among changed pixels between the $1^{st}$ image 901 of FIG. 9A and the $2^{nd}$ image 911 of FIG. 9B.

Figure 9C:
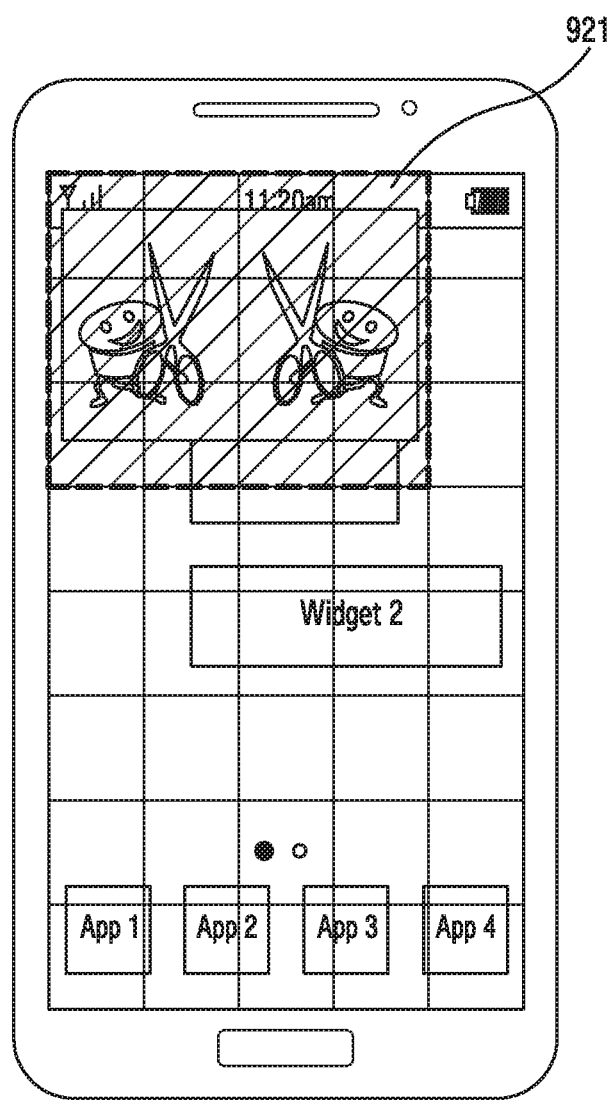

If the frame change is greater than or equal to the reference range, in step 807, the electronic device may increase a frame rate of a corresponding tile. According to one embodiment, referring to FIG. 9C, it is shown an example in which the number of changed pixels is greater than or equal to a reference number in a tile 921 among changed pixels between the $1^{st}$ image 901 and the $2^{nd}$ image 911. In this case, the electronic device may determine that users' eyes will be focused on the tile 921 in which the number of changed pixels is greater than or equal to the reference number and thus may increase a frame rate of the tile 921 to be greater than a current frame rate.

If there is no frame change greater than or equal to the reference range, in step 809, the electronic device maintains the frame rate or decreases the frame rate. For example, if the number of changed pixels is not greater than or equal to the reference number in the tile among the changed pixels between the $1^{st}$ image 501 of FIG. 9A and the $2^{nd}$ image 911 of FIG. 9B, the electronic device may determine that users' eyes will not be focused on one portion of the image but will be distributed, and thus may maintain the frame rate to the current frame rate or may decrease the frame rate to be lower than the current frame rate.

In the aforementioned various embodiments, regarding a time of determining whether there is a frame change in each piece of display data of the electronic device, analysis may be performed at a moment of updating a screen based on a user's input. According to one embodiment, the electronic device may drive a program based on a user's input, and may analyze display data at a time at which the screen moves through a touch gesture. According to one embodiment, if it is recognized that an analysis result of display data is similar during a reference number of times, the electronic device may maintain a determined frame rate until a time of recognizing a change in a screen display state of the program.

According to one embodiment, the electronic device may periodically determine whether there is a frame change of each piece of display data. According to one embodiment, how frequently the analysis will be performed as to whether there is the frame change may be determined by a user or may be pre-defined in a system.

According to one embodiment, the electronic device may determine whether there is a frame change in each piece of display data at a specific time. According to one embodiment, if a power level is decreased to be less than or equal to a reference level, the electronic device may determine whether there is a frame change in each pieces of display data and may determine a frame rate, thereby decreasing power consumption.

In the aforementioned embodiment, the electronic device may determine a frame rate by comparing a plurality of pieces of display data stored in a frame buffer.

According to another embodiment, if the plurality of pieces of display data are video, the electronic device may determine the frame rate based on a motion vector value in a decoding process before the display data is stored in the frame buffer.

According to one embodiment, in a process of decoding compressed video, the electronic device may estimate $2^{nd}$ display data based on $1^{st}$ display data to be displayed at a reference time and a motion vector value. According to one embodiment, if the motion vector value is a great value, the electronic device may recognize that a frame change between the $1^{st}$ display data and the $2^{nd}$ display data is great.

According to one embodiment, the electronic device may store decoded display data into a frame buffer and thereafter may determine a frame rate by comparing the $2^{nd}$ display data estimated based on the $1^{st}$ display data and the motion vector value.

The term "module" used in the present document may imply a unit including, for example, one of hardware, software, and firmware or a combination of two or more of them. The "module" may be interchangeably used with a term such as a unit, a logic, a logical block, a component, a circuit, and the like. The "module" may be a minimum unit of an integrally constituted component or may be a part thereof. The "module" may be a minimum unit for performing one or more functions or may be a part thereof. The "module" may be mechanically or electrically implemented. For example, the "module" according to various embodiments of the present disclosure may include at least one of an Application-Specific Integrated Circuit (ASIC) chip, a Field-Programmable Gate Arrays (FPGAs), and a programmable-logic device, which are known or will be developed and which perform certain operations.

At least some parts of an electronic device (e.g., modules or functions thereof) or method (e.g., operations) according to various embodiments may be implemented with an instruction stored in a computer-readable storage media for example. If the instruction is executed by one or more processors, the one or more processors may perform a function corresponding to the instruction. The computer-readable storage media may be, for example, the memory 130.

The computer readable recording medium may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), a hardware electronic device (e.g., a Read Only Memory (ROM), a Random Access Memory (RAM), a flash memory, or the like). An example of the program instruction includes not only a machine language created by a compiler but also a high-level language executable by a computer by using an interpreter or the like. The aforementioned hardware electronic device may be configured to operate as one or more software modules to perform the operation of various embodiments, and the other way around is also possible.

The module or programming module according to various embodiments may further include at least one or more constitutional elements among the aforementioned constitutional elements, or may omit some of them, or may further include additional other constitutional elements. Operations performed by a module, programming module, or other constitutional elements according to the various embodiments may be executed in a sequential, parallel, repetitive, or heuristic manner. In addition, some of the operations may be executed in a different order or may be omitted, or other operations may be added.

While various embodiments have been shown and described with reference to certain preferred embodiments thereof, it will be understood by those skilled in the art that various changes in form and details may be made therein without departing from the spirit and scope of the invention as defined by the appended claims. Therefore, the scope of the various embodiments is defined not by the detailed description of the invention but by the appended claims, and all differences within the scope will be construed as being included in the present invention.

What is claimed is:

1. A method for determining a frame rate in an electronic device, the method comprising:
    displaying, based on a frame rate, a first screen corresponding to a first image;
    identifying whether a number of pixels that change in a first reference area of the first image and a second image is greater than a threshold, the second image being subsequent to the first image;
    when the number of pixels is greater than or equal to the threshold, displaying, based on another frame rate that is different from the frame rate, a second screen corresponding to the second image; and
    when the number of pixels is not greater than or equal to the threshold, maintaining the frame rate and displaying, based on the maintained frame rate, the second screen.

2. The method of claim 1, wherein the changing of the frame rate further comprises:
    when the number of pixels is greater than or equal to the threshold, changing the frame rate to another frame rate higher than the frame rate.

3. The method of claim 1, further comprising:
    identifying whether a number of pixels that change in a second reference area of the first image and the second image is greater than or equal to the threshold; and
    when the number of pixels in the second reference area is greater than or equal to the threshold, changing a frame rate for each area to another frame rate different from the frame rate.

4. An electronic device comprising:
    a display;
    a memory; and
    a processor configured to:
    control the display to display, based on a frame rate, a first screen corresponding to a first image stored in the memory,
    identify whether a number of pixels that change in a first reference area of the first image and a second image is greater than a threshold, the second image being subsequent to the first image and stored in the memory,
    when the number of pixels is greater than or equal to the threshold, control the display to display, based on another frame rate that is different from the frame rate, a second screen corresponding to the second image, and
    when the number of pixels is not greater than or equal to the threshold, control the display to maintain the frame rate and display, based on the maintained frame rate, the second screen.

5. The electronic device of claim 4, wherein the processor is further configured to:
    when the number of pixels is greater than or equal to the threshold, change the frame rate to another frame rate higher than the frame rate.

6. The electronic device of claim 4, wherein the processor is further configured to:
    identify whether a number of pixels that change in a second reference area of the first image and the second image is greater than or equal to the threshold; and
    when the number of pixels in the second reference area is greater than or equal to the threshold, change a frame rate for each area to another frame rate different from the frame rate.

7. The method of claim 6, wherein the first reference area and the second reference area are tiles in a grid that encompasses an entire area of the display.

* * * * *